(12) United States Patent
Lüzlbauer

(10) Patent No.: US 8,230,560 B2
(45) Date of Patent: Jul. 31, 2012

(54) FASTENING SYSTEM FOR SHOES

(75) Inventor: Adolf Lüzlbauer, Steinbach am Attersee (AT)

(73) Assignee: Fischer Sports GmbH, Ried Im Innkreis (AT)

( * ) Notice: Subject to any disclaimer, the term of this patent is extended or adjusted under 35 U.S.C. 154(b) by 310 days.

(21) Appl. No.: 12/524,583

(22) PCT Filed: Nov. 12, 2007

(86) PCT No.: PCT/AT2007/000508
§ 371 (c)(1),
(2), (4) Date: Jul. 27, 2009

(87) PCT Pub. No.: WO2008/092175
PCT Pub. Date: Aug. 7, 2008

(65) Prior Publication Data
US 2010/0107379 A1    May 6, 2010

(30) Foreign Application Priority Data
Jan. 31, 2007    (AT) .................................. A 155/2007

(51) Int. Cl.
*A43C 1/06*    (2006.01)

(52) U.S. Cl. ........................................ 24/713.4; 36/50.1
(58) Field of Classification Search ........................ None
See application file for complete search history.

(56) References Cited

U.S. PATENT DOCUMENTS

| 61,487 A * | 1/1867 | Vollschwitz .................... 24/713 |
| 384,437 A * | 6/1888 | Frantz ............................... 36/47 |
| 640,755 A * | 1/1900 | Donavan ..................... 24/714.7 |
| 2006/0017242 A1 | 1/2006 | Marechal et al. |

FOREIGN PATENT DOCUMENTS

| DE | 19710702 A1 | 9/1998 |
| DE | 10239927 A1 | 9/2003 |
| DE | 20316425 U1 | 12/2003 |
| DE | 102004044801 A1 | 7/2005 |
| EP | 1618929 A1 | 1/2006 |
| WO | 0053045 A1 | 9/2000 |

\* cited by examiner

*Primary Examiner* — Jack W. Lavinder
(74) *Attorney, Agent, or Firm* — Laurence A. Greenberg; Werner H. Stemer; Ralph E. Locher

(57) ABSTRACT

Fastening system for shoes which are fastened by way of fastening laces. An insert opening has interengaging tabs which have end-mounted deflection elements for guiding the shoelace. The laces are organized so that no crossover or overlapping shoe laces are present in the instep and ball region of the foot.

1 Claim, 3 Drawing Sheets

FASTENING SYSTEM FOR SHOES

BACKGROUND OF THE INVENTION

Field of the Invention

The invention relates to a lacing system for shoes, in particular for sports shoes.

Usually, lacing systems are configured such that the shoelaces are guided through loops or eyes or the like and are alternately deflected from the left to the right of the shoe shaft, thus crossing each other correspondingly by nature. A disadvantage of this system is particularly evident if the shoe is used as an internal shoe, e.g. if the internal shoe is covered by a shell. In this case, pressure marks will be produced on the foot at the crossing points of the shoelaces. To eliminate this deficiency, paddings are often installed beneath the lacing. Tongues with a padding may also provide remedy.

Lacing systems for shoes have been known from FR 2 722 659 A1 and WO 1989/08411 A1, wherein the opening for insertion into the shoe comprises intermeshing tabs with guiding elements at their ends for deflecting the shoelace. These known lacing systems could not provide remedy either.

BRIEF SUMMARY OF THE INVENTION

It is an object of the invention to create a lacing system by means of which the deficiencies of lacing systems known so far can be eliminated.

This object is achieved by the measure of the characterising part of claim 1.

The measure of claim 2 allows for a particularly flexible construction which, on the one hand, ensures a perfect instep fit and, on the other hand, prevents the upper from wrinkling during shoe bending, e.g. during walking.

The opening for insertion into the shoe comprises intermeshing tabs which, at their ends, have guiding elements for deflecting the shoelace.

According to the measure of claim 3, the intermeshing tabs allow for the distance between the guiding element 4 of the tab 8 and the additional element 9 to be controllable, resulting in a likewise controllable angle of traction of the shoelace, thus enabling the tractive force of the lacing to be specifically adapted to the shoe requirement.

Further advantages are reached by the measures of the subclaims.

Further features of the invention will be explained by way of the drawings which show exemplary embodiments of the known and the inventive lacing system. Therein:

DESCRIPTION OF THE INVENTION

Figure 1:
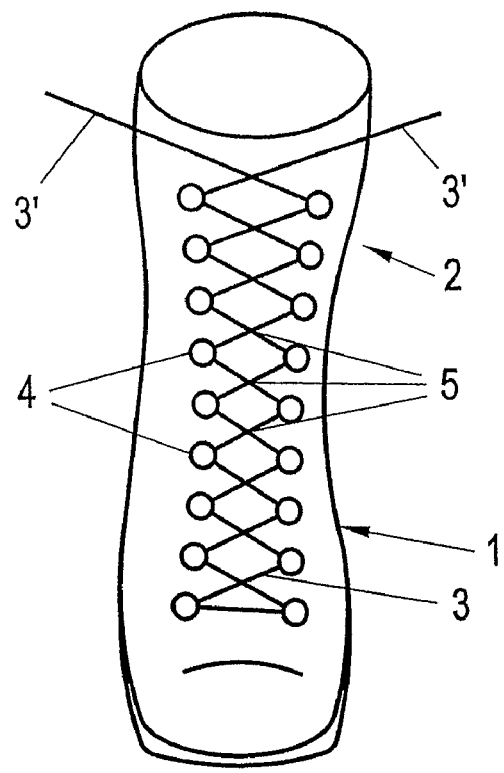
FIG. 1 shows a front view of a conventional lace-up shoe.

In FIG. 1, 1 denotes the ball and instep region and 2 the shaft region, the latter extending from the ankle joints upwards. 3 denotes the shoelace which is guided through openings 4. These openings 4 can be designed as eyes, loops, hooks, etc., in a manner known per se.

The shoelace 3 may be a single-piece shoelace, as in the present case. Yet, it may also consist of two parts, wherein it will then be attached to the upper of the shoe on either side in the tip region of the shoe, e.g. with knots or by sewing.

The ends 3' of the shoelace are usually knotted by the user. The crossing points 5 of the shoelace are clearly visible.

These crossing points have the disadvantage of producing punctual pressure marks when the shoelaces have been laced tightly, leading to pains in particular in the sensitive instep region of the human foot. In this case, the user must loosen the the shoelaces appropriately, leading to a worse stability of the foot in the shoe and, in the worst case, to painful blister formation due to the foot slipping in the shoe.

Figure 2:
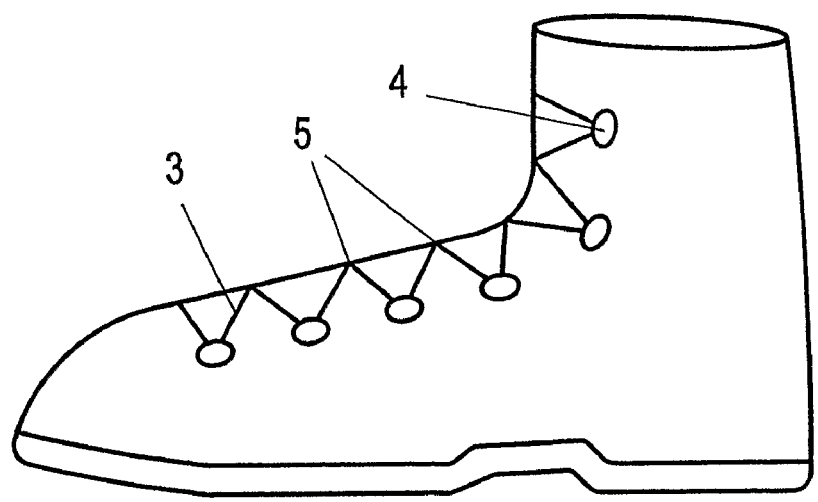
FIG. 2 shows the shoe of FIG. 1 in a side view.

In the illustration of the shoe shown in FIG. 2, the crossing sections 5 of the shoelace 3 are located directly at the vertex of the shoe.

Figure 3:
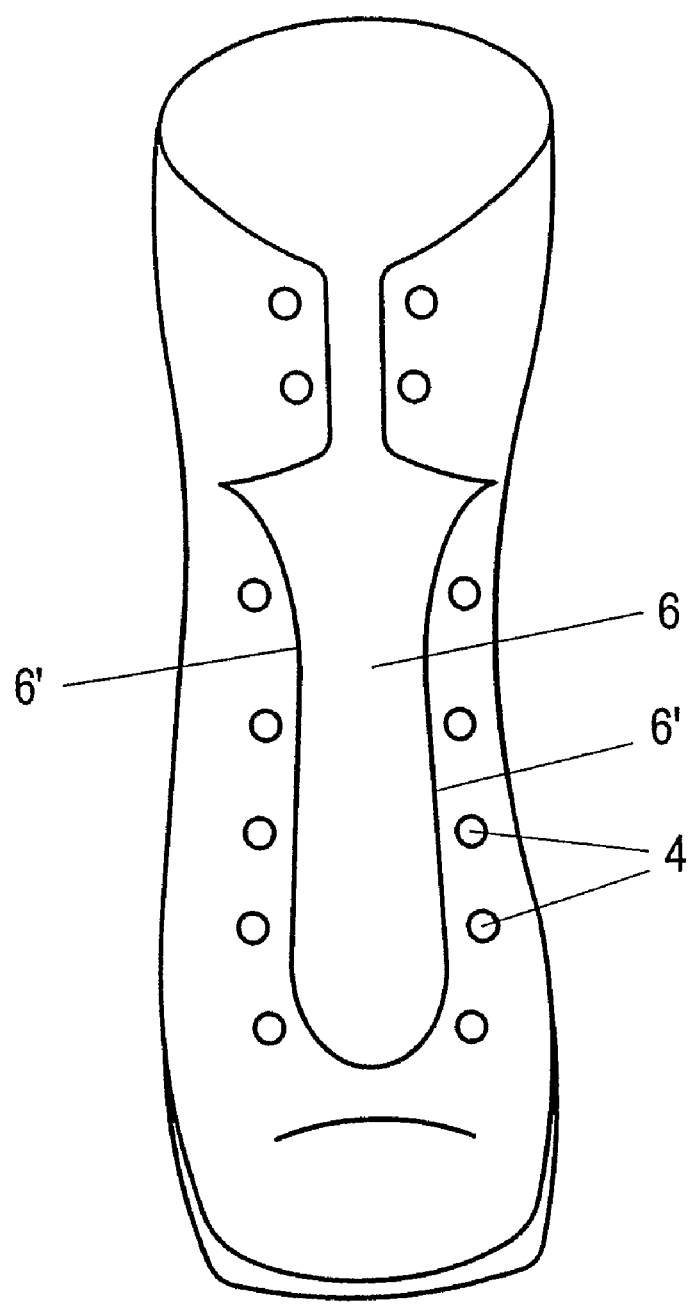
FIG. 3 shows a prior-art shoe without shoelaces.

In the known shoe embodiment of FIG. 3, the shoe has opening 4 for the shoelace, as well as an opening 6 which serves for adapting the shoe individually to the foot of the respective user by interaction with the lacing of the shoelace. For the sake of a good overview, no details, e.g. no so-called water flaps, are shown.

Figure 4:
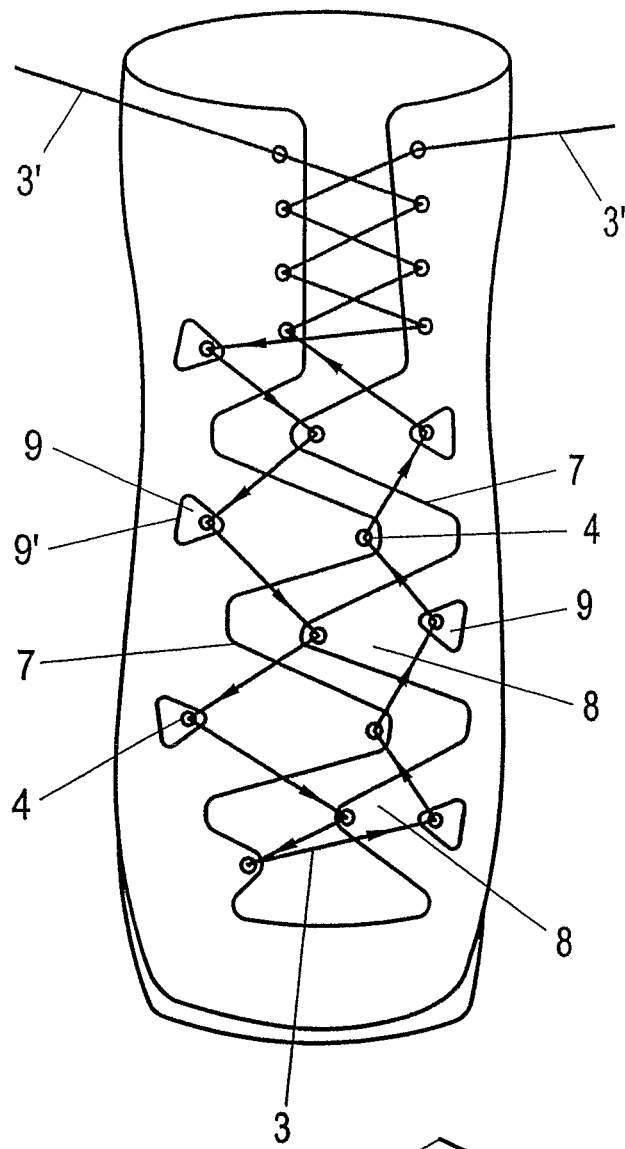
FIG. 4 shows the inventive lace-up shoe in a front view.
Figure 5:
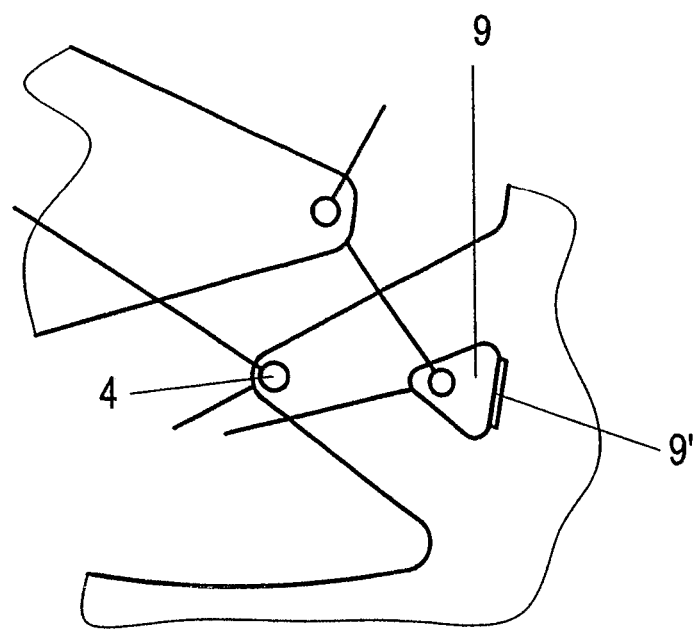
FIG. 5 shows a scaled-up detail of FIG. 4.

With the inventive shoe according to FIGS. 4 and 5, the opening 6 is formed by a meander-shaped course of the lines 7 and not by parallel delimiting lines, as is the case in FIG. 3.

Thus, intermeshing tabs 8 are formed which, at their ends, have means 4, e.g. eyes, loops, hooks, etc., which are attached in a manner known per se and through which the shoelace 3 will be guided. Furthermore, the shoe comprises additional means 9, e.g. tabs sewn-on, adhered, or riveted, along line 9', which are likewise designed with means 4 for guiding the shoelace. Having followed the shoelace 3 in arrow direction, one will recognise that the tabs 8 and the additional means 9 form no crossing points, at least not in the instep and ball region, and that the shoe may nevertheless be tightened.

This lacing system may also be used for all kinds of lace-up shoes, e.g. for low-shoes, climbing shoes, boots, sports shoes, e.g. shoes for cross-country skiing, and also for shoes made of rigid synthetic material provided with internal shoes, e.g. internal shoes for skiing shoes.

The invention claimed is:
1. A lacing system for a shoe of the type wherein a shoelace tightens the shoe above an instep and ball region of a wearer's foot, comprising:
   a meander-shaped front-side opening for insertion into the shoe formed with intermeshing flaps having roots and free ends;
   a shoelace having two ends and being disposed without crossing points at least in the instep and ball region of the shoe;
   guiding elements disposed at said free ends of said intermeshing flaps for deflecting said shoelace; and
   tabs with deflecting elements for guiding said shoelace disposed at said roots of said intermeshing flaps.

* * * * *